United States Patent

Shimshi

[11] Patent Number: 5,673,872
[45] Date of Patent: *Oct. 7, 1997

[54] APPARATUS FOR ENERGY TRANSFORMATION AND CONSERVATION

[76] Inventor: Ezra Shimshi, P.O. Box 421011, Atlanta, Ga. 30342

(List continued on next page.)

The term of this patent shall not extend beyond the expiration date of Pat. No. 5,427,330.

[21] Appl. No.: 654,109

[22] Filed: May 28, 1996

[51] Int. Cl.$^6$ .................................................. B64D 27/02
[52] U.S. Cl. .................................................. 244/62
[58] Field of Search .......................... 244/172, 62, 1 R, 244/4 R; 74/84 R, 84 S

[56] References Cited

U.S. PATENT DOCUMENTS

| | | | |
|---|---|---|---|
| 2,350,248 | 5/1944 | Nowlin | 74/84 S |
| 4,238,968 | 12/1980 | Cook | 74/84 S |
| 4,744,259 | 5/1988 | Peterson | 74/84 S |
| 5,167,163 | 12/1992 | McMahon | 74/84 S |
| 5,335,561 | 8/1994 | Harvey | 74/84 S |
| 5,427,330 | 6/1995 | Shimshi | 244/62 |

*Primary Examiner*—Galen L. Barefoot

[57] ABSTRACT

Apparatus with units having mechanical structures adapted to lengthen radius h (43') and shorten radius s (42') of their rotating mass. Said units can be combined in a radial arrangement. Said units are adapted to spin under the influence of centrifugal force, refers to as centrifugal propellant (60). These spins are adapted to activate said rotating mass when under the influence of centrifugal forces (42) and centrifugal force (43) so as to lengthen and shorten the radius of rotation of said rotating mass. The spinning units adapted to store kinetic energy like flywheels. Another radial arrangement of said units can be adapted to improve aerodynamical properties. Said units can, further, be adapted to improve the efficiency of energy production and for navigational purposes.

7 Claims, 2 Drawing Sheets

— 1 —

APPARATUS FOR ENERGY TRANSFORMATION AND CONSERVATION

BACKGROUND OF THE INVENTION a) Field of the Invention

This invention relates to a class of devices which utilizes mechanical structures for lengthening and shortening the radius of their rotating mass at predetermined sectors in the path of rotation. Subjecting rotatable mass to centrifugal forces for the purpose of transforming energy to be stored and for the purpose of reducing drag are among the goals of this invention. Subjecting rotatable mass to the pull of gravity for more efficient production of energy is another goal of this invention. Subjecting rotatable mass to an electromagnetic field for more efficient power supply is a further goal of this invention.

b) The Prior Art

The prior art has provided a unique concept upon which new technology can be developed and more efficient machines may be invented.

The most pertinent prior art known to the Applicant at the time of filing this application is embodied in U.S. Pat. No. 5,427,330, Issued: Jun. 27, 1995, Inventor: Ezra Shimshi.

SUMMARY OF THE INVENTION

The objects of the present invention are to provide simple apparatus for storing energy similar to a flywheel, to provide easily adaptable apparatus that can be utilized to improve power generating means, to provide affordable apparatus for reduction of the high pressure created in front of a moving object and for minimizing tail turbulence, and to provide alternate technology for navigation purposes.

BRIEF DESCRIPTION OF THE DRAWINGS

In the accompanying drawings forming part of this specification, and in which like reference characters are employed to designate like parts throughout the same.

DESCRIPTION OF THE INVENTION

Figure 1:
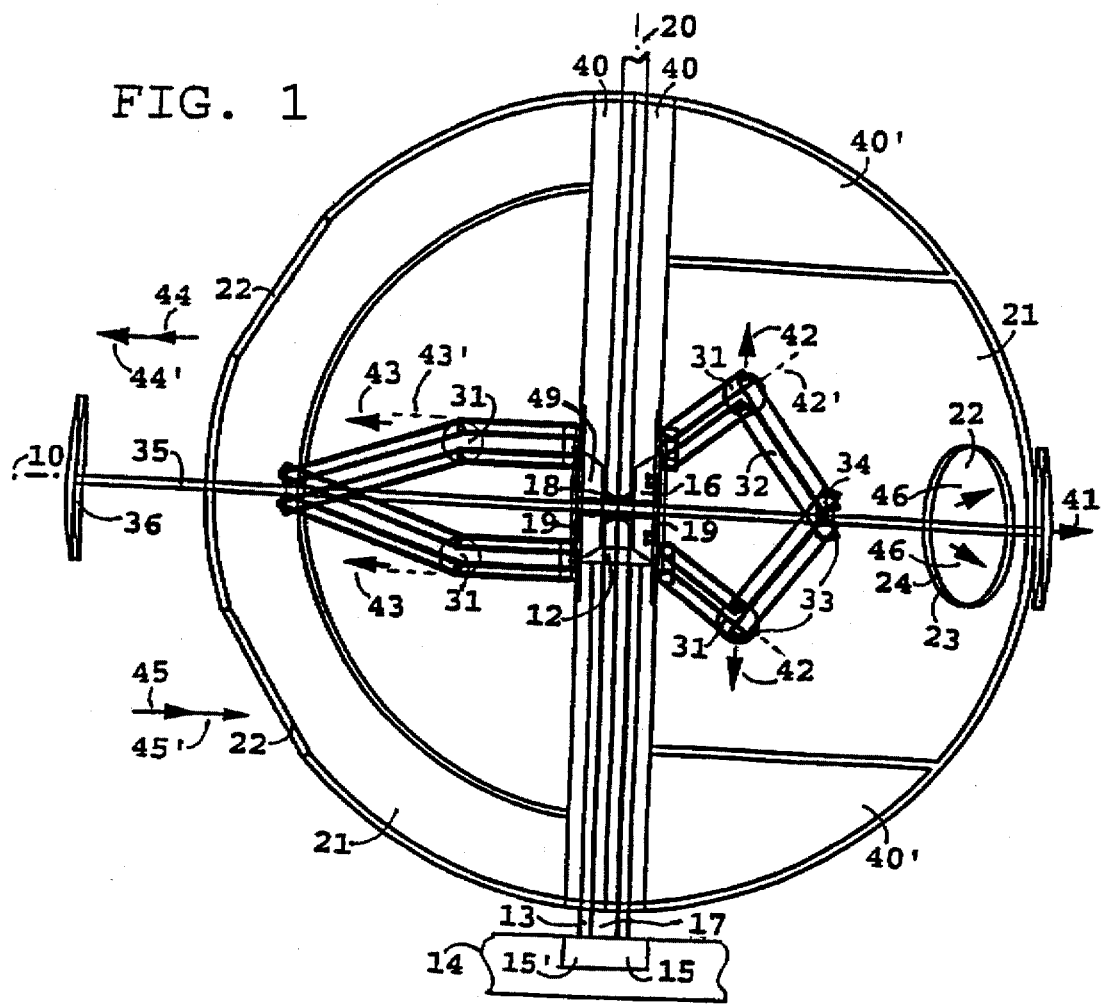
FIG. 1 is a side view illustrating the device of the prior art, cited above, with its components.
Figure 2:
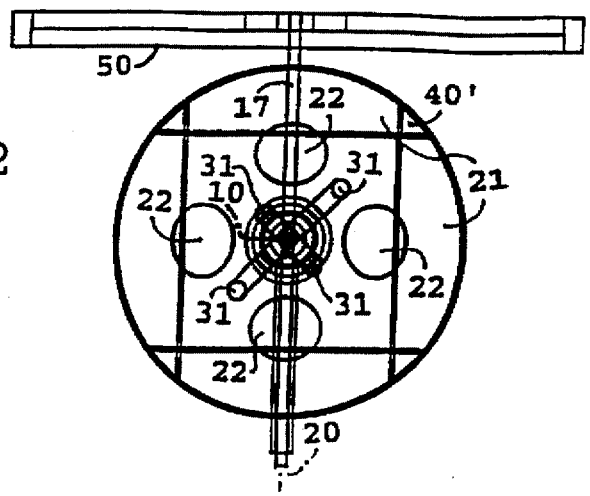
FIG. 2 is a front view of said device illustrating both the chambers and the mass members.

The present apparatus combines several of said devices, mounted preferably in pairs, within a wheel or a rotating object (50'). The rotating object (50') produces centrifugal force, hereinafter refers to as centrifugal propellant (60), that can force said devices to spin about their own axes of rotation (20). The present invention and the aforementioned prior art are based on the same principle. The present apparatus includes some or all of the components listed in said prior art as illustrated in FIG. 1. and in FIG. 2.

The following are the numbers and the parts they represent in the drawings:

10 Secondary axis, 12 Stationary gear, 13 Sleeve, 14 Frame, 15 Motor, 15' Generator, 16 Drive gear, 17 Shaft, 18 Drive bearing, 19 Axle, 20 Primary axis, 21 Chamber, 22 Channel, 23 Cylinder, 24 Rim, 31 Mass member, 32 Bracket, 33 Hinge, 34 Pin, 35 Rod, 36 Saucer, 40 Strip, 40' Hemisphere, 41 Linear movement, 42 Centrifugal forces, 42' Radius s, 43 Centrifugal force, 43' Radius h, 44 Reciprocal motion, 44' Direction of travel, 45 Mass resistance, 45' Vacuum, 46 Jet thrust, 49 Twin bevel-gear, 50 Wheel, 50' Rotating object, 60 Centrifugal propellant, 61 Tube, 62 Fluid, 63 Gear, 63' Control gear, 63" Flexible shaft, 64 Central gear, 64' Central control gear, 65 Housing, 66 Large cylinder, 67 Small cylinder, 70 Axis, 80 Spin control.

Figure 3:
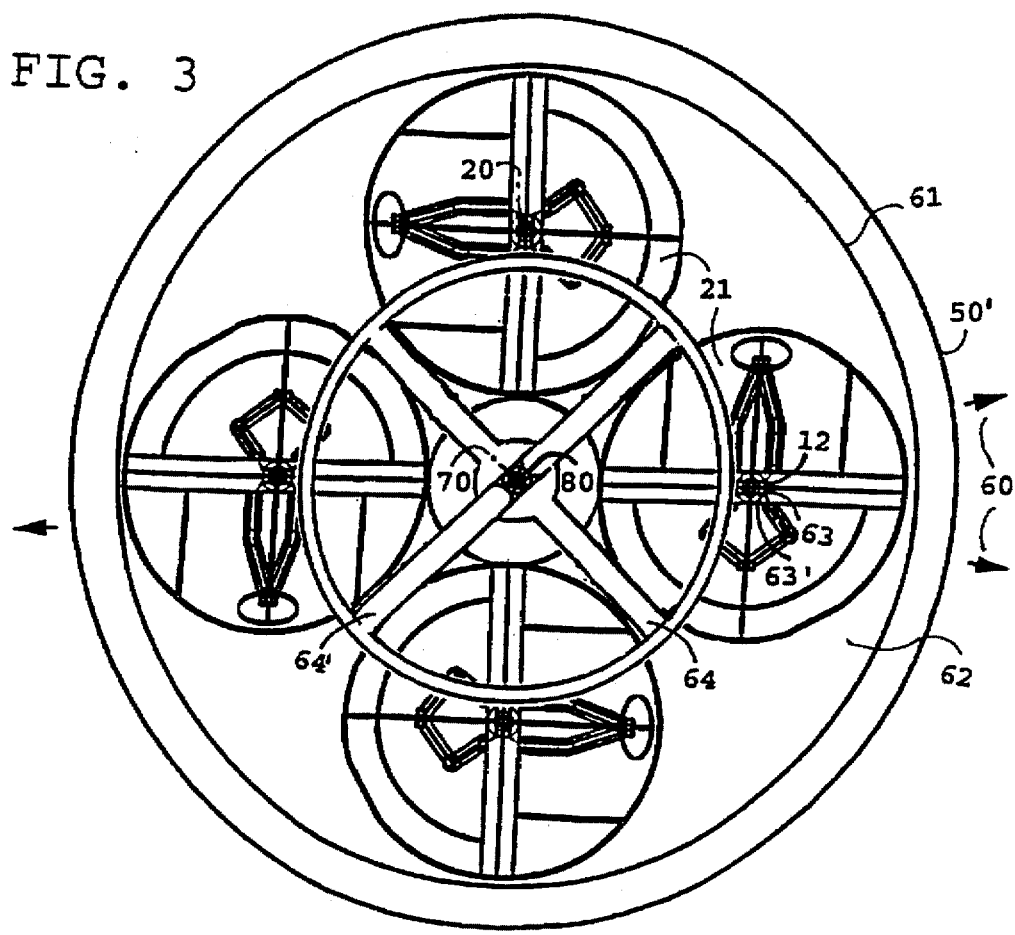
FIG. 3 is a side view of the present apparatus illustrating the tube attached to a rotating object with top view of the devices of said prior art within said tube in a radial arrangement.

The present apparatus can be used to store the brake-heat energy of a slowing vehicle, which energy is otherwise being wasted. FIG. 3 depicts pairs of said devices arranged radially inside a circular donut-like tube (61) filled with fluid (62) and attached to a wheel (50'). Each of said devices is adapted to spin about its own primary axis (20). Each of said wheel (50') of said vehicle produces centrifugal propellant (60) when rotating. Said centrifugal propellant (60) is adapted to force said devices to spin any time the reduction in speed of the vehicle is desired. When chambers (21) are oriented perpendicularly to the direction of centrifugal propellant (60), fluid (62) within said chambers (21) are adapted to carry said chambers (21) outward. The opposite chamber (21) in each of said devices, which is oriented in parallel to the direction of said centrifugal propellant (60), is adapted to slide inward and let fluid (62) in said opposite chamber (21) escape outward. Stationary gears (12) are adapted to turn 90 or 180 degrees by spin control (80). When the mother vehicle is in motion said devices are in neutral position. A 90 degree turn of stationary gears (12) is adapted to place said devices under the influence and impact of centrifugal propellant (60) which forces said devices to spin in the direction of said wheel (50'). These spins create propulsive and reactive forces which slows said vehicle down. A 180 degree turn of said stationary gears (12) switches the position of chambers (21) from perpendicular to parallel and from parallel to perpendicular in relation to the direction of centrifugal propellant (60). Said switch is adapted to decelerate the spins of said devices. Said deceleration transforms the stored energy in terms of additional power that accelerate said vehicle. A turn of 90 degrees of stationary gears (12) is adapted to neutralize said devices so that said devices can again be ready to store the brake-heat energy. Gears (63) mesh with central gear (64), which central gear (64) revolves independently about axis (70), for the purpose of synchronizing the spins of said devices in relation to each other. Said synchronization is adapted to keep at least two of said devices, opposite to each other, under effective impact of said centrifugal propellant (60). Gears (63') mesh with central gear (64'), which central gear (64') is connected to spin control (80) so as to enable said spin control (80) to control the orientation of said chambers (21) through cables connected to the gas and brake pedals.

Mass members (31) in FIG. 3 can be adapted in combination with said chambers (21) to reinforce the devices' spin. Saucer (36) can be mounted along rod (35), and both saucers (36) and rod (35), can be used as weight and as fluid displacing buoys in said chambers (21). Additional gears similar to gear 63 and central gear 64 can be adapted to control the direction of the spins of said devices so as to allow one group of said devices to spin in one direction and a second group to spin in the opposite direction.

A clutch can be added so as to propel central gear 64, when sealed chambers (21) are used. Fluid in said sealed chambers (21) is adapted to react to centrifugal forces (42)

and centrifugal force (43). Said fluid inside chambers (21) is adapted to flow between the sectors of radius s (42') and radius h (43') so as to cause the desired impact by centrifugal propellant (60). The fluid-filled sealed chambers (21) can also be adapted to spin in a vacuum.

The apparatus can be adapted as two wheels rotating in opposite direction. The wheel, which is adapted to propel fluid (62) in tube (61) as a wheel, is in turn being impacted by the developing reactive force.

The present apparatus can be adapted to form energy of motion. Several devices of said prior art which are mounted in a radial arrangement can be adapted to revolve about their primary axes (20) by orienting their mass members (31) to extend horizontally toward one side (43') so as to out-weigh the opposite side and to produce circular motion. At a predetermined rpm, motor (15) is adapted to convert into a generator (15') which will generate electricity more efficiently in conjuncture with turbines, windmills and other energy generating machines. This apparatus can be used also for navigational purposes.

Figure 4:
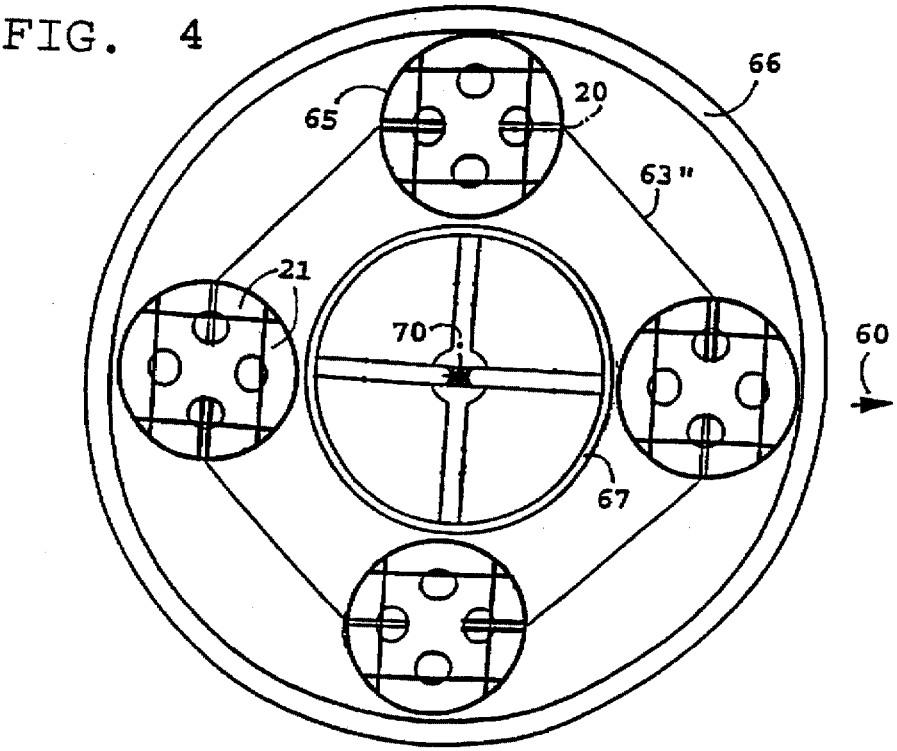
FIG. 4 is a front view of said devices in a radial arrangement, each within its own housings and between large and small cylinders.

The present apparatus can be adapted to force fluid from the front of a moving vehicle or craft to the rear so as to minimize frontal drag and tail turbulence as shown in FIG. 4. Pairs of the devices of said prior art, each within cylindrical housing (65), are mounted between the inner wall of a large cylinder (66) and the outer wall of a small cylinder (67) in a radial arrangement. Front chamber (21) of each of said devices is adapted to face incoming flow of fluid at an angle. This angular position forces fluid into front chambers (21) when in operation. Each of said devices is adapted to rotate about its own primary axis (20). The fluid-filled front chambers (21) swings outward under the influence of centrifugal propellant (60). The fluid-filled back chambers (21) do not react to said centrifugal propellant (60), therefore, back chambers (21) will turn inward. This effect is produced when said front chambers (21) are perpendicular to the direction of said centrifugal propellant (60), and back chambers (21) are parallel to said direction of centrifugal propellant (60). The flexible shaft (63"), which connects said devices to each other, synchronizes the rotations of said devices so as to have at least two opposing devices under the influence and impact of centrifugal propellant (60). A cage fan mounted around the center sector of each device can be adapted to force the device to spin so as to employ the effect of said centrifugal propellant (60).

While this invention has been described with reference to the structure disclosed herein, it is not confined to the details as set forth and is not intended in any way to limit the broad features or principles of the machine, or the scope of patent monopoly to be granted. This application is intended to cover any modification or changes that may come within the scope of the following claims.

I claim:

1. Apparatus for storing energy, otherwise wasted, to improve forward power, comprising:
   a. a frame,
   b. rotatable mass,
   c. means for spinning said rotatable mass when said rotatable mass is oriented perpendicularly to the direction of said spinning means on one side of the circle of rotation and parallel on the opposite side,
   d. means for synchronizing the rotations of said rotatable mass so as to lengthen and to shorten the radius of rotation of said rotatable mass at predetermined sectors in the path of rotation,
   e. means for locking said synchronizing means to said frame,
   f. means for attaching said rotatable mass to said synchronizing means,
   g. means for producing said spinning means.

2. The apparatus of claim 1, wherein said apparatus includes several units of said rotatable mass and secondary means for synchronizing the spins of said several units with each other.

3. The apparatus of claim 1, further comprising:
   a. means for confining said rotatable mass,
   b. means for controlling the spins of said rotatable mass.

4. A system for improving aerodynamic properties in a moving object, comprising:
   a. a frame,
   b. rotatable mass,
   c. means for spinning said rotatable mass when said rotatable mass is oriented perpendicularly in relation to the direction of the spinning means at the front and parallel at the rear,
   d. means for synchronizing the rotations of said rotatable mass so as to lengthen and to shorten the radius of rotation of said rotatable mass at predetermined sectors in the path of rotation,
   e. means for locking said synchronizing means to said frame,
   f. means for attaching said rotatable mass to said synchronizing means,
   g. means for activating said spinning means.

5. The system of claim 4, wherein said system includes several units of said rotatable mass and secondary means for synchronizing the spins of said several units with each other.

6. A method for energy transformation and conservation, including the steps:
   a. locking rotatable mass to a means for synchronizing said rotatable mass,
   b. anchoring said means for synchronizing said rotatable mass to a frame,
   c. spinning said rotatable mass so as to cause the lengthening and shortening of the radius of rotation of said rotatable mass at predetermined sectors in the path of rotation.

7. The method of claim 6, whereas said method further includes the steps:
   a. combining several units of said rotatable mass,
   b. synchronizing said several units of said rotatable mass with each other.

* * * * *